(12) United States Patent
Chung

(10) Patent No.: US 12,128,862 B2
(45) Date of Patent: Oct. 29, 2024

(54) ELECTRONIC PARKING BRAKE SYSTEM AND CONTROL METHOD THEREOF

(71) Applicant: HL MANDO CORPORATION, Pyeongtaek (KR)

(72) Inventor: Seokhwan Chung, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 421 days.

(21) Appl. No.: 17/745,915

(22) Filed: May 17, 2022

(65) Prior Publication Data

US 2022/0371569 A1    Nov. 24, 2022

(30) Foreign Application Priority Data

May 24, 2021    (KR) .................. 10-2021-0066203

(51) Int. Cl.
| | |
|---|---|
| *B60T 13/00* | (2006.01) |
| *B60T 8/17* | (2006.01) |
| *B60T 13/74* | (2006.01) |
| *B60T 17/18* | (2006.01) |

(52) U.S. Cl.
CPC .............. *B60T 13/746* (2013.01); *B60T 8/17* (2013.01); *B60T 17/18* (2013.01); *B60T 2250/00* (2013.01)

(58) Field of Classification Search
CPC .......... B60T 8/17; B60T 17/18; B60T 13/746; B60T 2250/00; G07C 5/085
See application file for complete search history.

(56) References Cited

U.S. PATENT DOCUMENTS

| | | | | |
|---|---|---|---|---|
| 2007/0173984 | A1* | 7/2007 | Nakayama | .............. B60T 13/74 701/1 |
| 2010/0318256 | A1* | 12/2010 | Breuer | ....................... B60T 7/22 701/31.4 |
| 2017/0263120 | A1* | 9/2017 | Durie, Jr. | ................ G08G 1/205 |
| 2021/0229697 | A1* | 7/2021 | Lee | ......................... B60W 30/08 |
| 2023/0347883 | A1* | 11/2023 | Rózsa | ............... B60W 30/0956 |

FOREIGN PATENT DOCUMENTS

| | | | |
|---|---|---|---|
| KR | 101257353 | B1 | 4/2013 |
| KR | 101626469 | B1 | 6/2016 |

* cited by examiner

*Primary Examiner* — Nicholas J Lane

(74) *Attorney, Agent, or Firm* — Harvest IP Law, LLP

(57) ABSTRACT

An electronic parking brake system includes an electronic parking brake, including an electric motor, and a controller configured to control the electric motor to engage the electronic parking brake, and when a vehicle motion detection signal is received from a black box through a controller area network (CAN) bus in a state where an ignition is turned off and the electronic parking brake is engaged, the controller is configured to re-engage the electronic parking brake.

7 Claims, 6 Drawing Sheets

ELECTRONIC PARKING BRAKE SYSTEM AND CONTROL METHOD THEREOF

CROSS-REFERENCE TO RELATED APPLICATION

This application is based on and claims priority under 35 U.S.C. § 119 to Korean Patent Application No. 10-2021-0066203, filed on May 24, 2021 in the Korean Intellectual Property Office, the disclosure of which is incorporated herein by reference.

BACKGROUND

1. Technical Field

The disclosure relates to an electronic parking brake system and a control method thereof that may control an operation and a release of an electronic parking brake.

2. Background Art

The motor-on-caliper-type electronic parking brake system increases a torque, generated from an electric motor of the electronic parking brake, through a reducer to generate a clamping force required for parking by a mechanical system inside a caliper.

When parking, a controller of the electronic parking brake system generates a clamping force by pressing a brake pad to a brake disc, which rotates together with a vehicle wheel, by moving a piston forward by an electric motor of the electronic parking brake. Also, when parking is released, the controller releases the generated clamping force by releasing the pressure on the brake pad from the brake disc by moving the piston backward by the electric motor.

Conventionally, a parking brake may be engaged, only while power is applied to a controller. Accordingly, when the controller is turned off since an ignition is turned off, an electronic parking brake may not be additionally engaged even when a vehicle is moved, causing an accident.

SUMMARY

An aspect of the disclosure provides an electronic parking brake system and a control method thereof that may automatically re-engage an electronic parking brake, when a parked vehicle is moved with the electronic parking brake engaged and with an ignition turned off, thereby may prevent an accident.

Additional aspects of the disclosure will be set forth in part in the description which follows and, in part, will be obvious from the description, or may be learned by practice of the disclosure.

According to an aspect of the disclosure, there is provided an electronic parking brake system, including: an electronic parking brake including a pair of brake pads disposed on both sides of a brake disc rotating with a rear wheel of a vehicle, a piston provided to press the pair of brake pads, a nut member provided to press the piston, a spindle member provided to move the nut member, and an electric motor configured to rotate the spindle member; and a controller configured to control the electric motor to engage the electronic parking brake, wherein, when a vehicle motion detection signal is received from a black box through a controller area network (CAN) bus in a state where an ignition is turned off and the electronic parking brake is engaged, the controller is configured to re-engage the electronic parking brake.

The controller is configured to switch from a sleep mode to a wake-up mode according to the received vehicle motion detection signal.

The controller is configured to determine a degree of movement of the vehicle from the received vehicle motion detection signal, and switch from the sleep mode to the wake-up mode according to the determined degree of movement.

The controller includes a processor, a power circuit, a power switch, an OR circuit, and a driving circuit, the power circuit is configured to generate an operating power from a power provided from a battery and provide the operating power to the processor and the driving circuit, the power switch is provided between the battery and the power circuit and configured to supply battery power from the battery to the power circuit or block the battery power, the OR circuit is configured to turn on or off the power switch according to a control signal of the processor, the driving circuit is configured to drive the electric motor according to the control signal of the processor, and when the vehicle motion detection signal is received from the black box through the CAN bus in the state where the ignition is turned off and the electronic parking brake is engaged, the processor is configured to turn on the power switch through the OR circuit to receive the operating power from the power circuit.

According to another aspect of the disclosure, there is provided a control method of an electronic parking brake system configured to control an electronic parking brake including a pair of brake pads disposed on both sides of a brake disc rotating with a rear wheel of a vehicle, a piston provided to press the pair of brake pads, a nut member provided to press the piston, a spindle member provided to move the nut member, and an electric motor configured to rotate the spindle member, the control method including: when a vehicle motion detection signal is received from a black box through a CAN bus in a state where an ignition is turned off and the electronic parking brake is engaged, re-engaging the electronic parking brake.

The re-engaging of the electronic parking brake includes switching from a sleep mode to a wake-up mode according to the received vehicle motion detection signal.

The re-engaging of the electronic parking brake includes determining a degree of movement of the vehicle from the received vehicle motion detection signal, and switching from the sleep mode to the wake-up mode according to the determined degree of movement.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
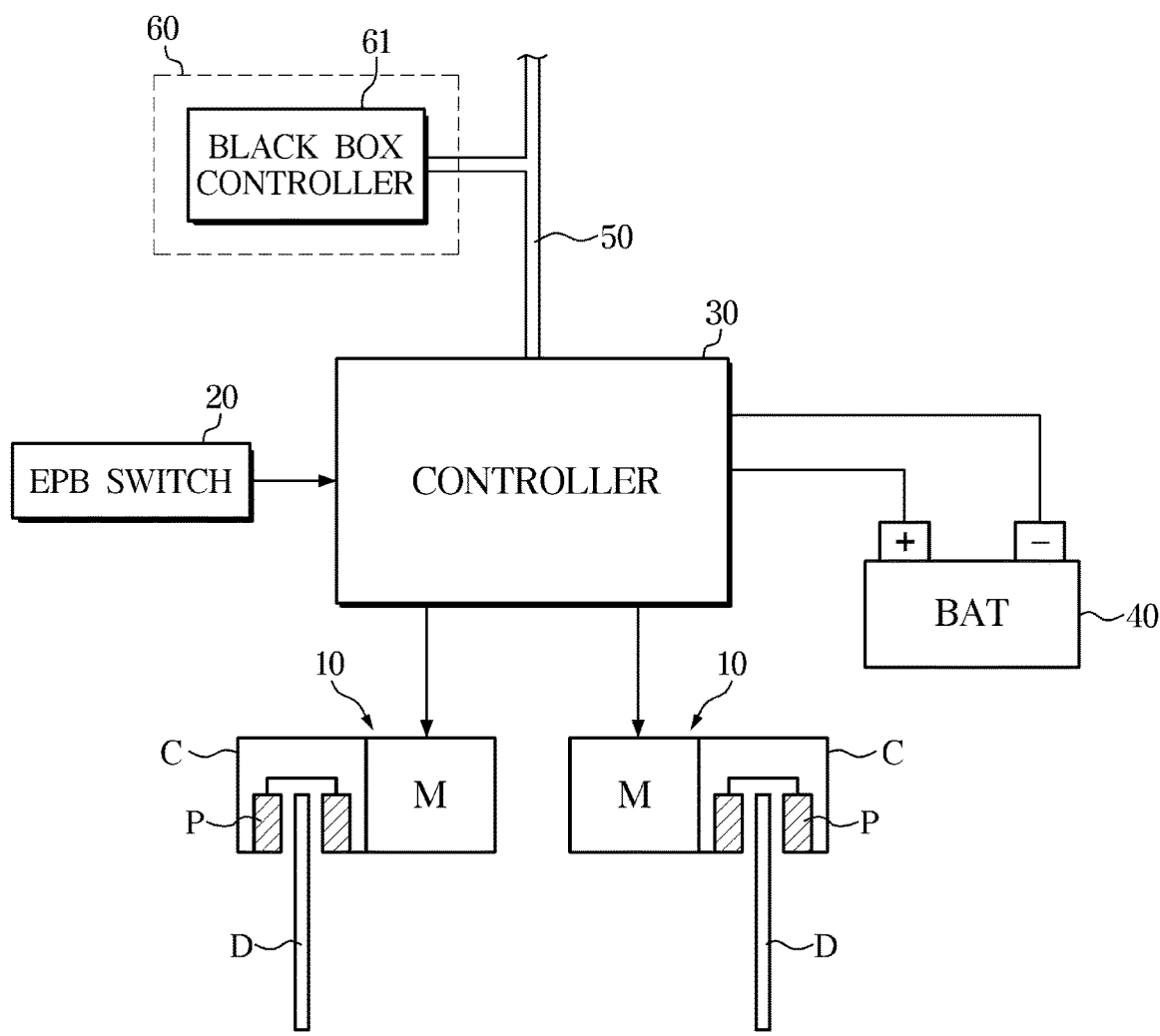
FIG. 1 illustrates a configuration of an electronic parking brake system according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

FIG. 1 illustrates a configuration of an electronic parking brake system according to an embodiment.

Referring to FIG. 1, an electronic parking brake system according to an embodiment may include an electronic parking brake (EPB) 10, an EPB switch 20 and a controller 30.

The EPB 10 may provide a parking braking force to a brake disc rotating with each of the left and right rear wheels.

The EPB 10 generates a clamping force for parking with respect to each of the rear wheels. The EPB 10 is controlled by the controller 30.

The EPB 10 is operated by a motor M to generate the clamping force. The EPB 10 generates the clamping force by pressing a brake pad P to the brake disc D in a brake caliper C of each of the left and right rear wheels by driving the motor M.

Figure 2:
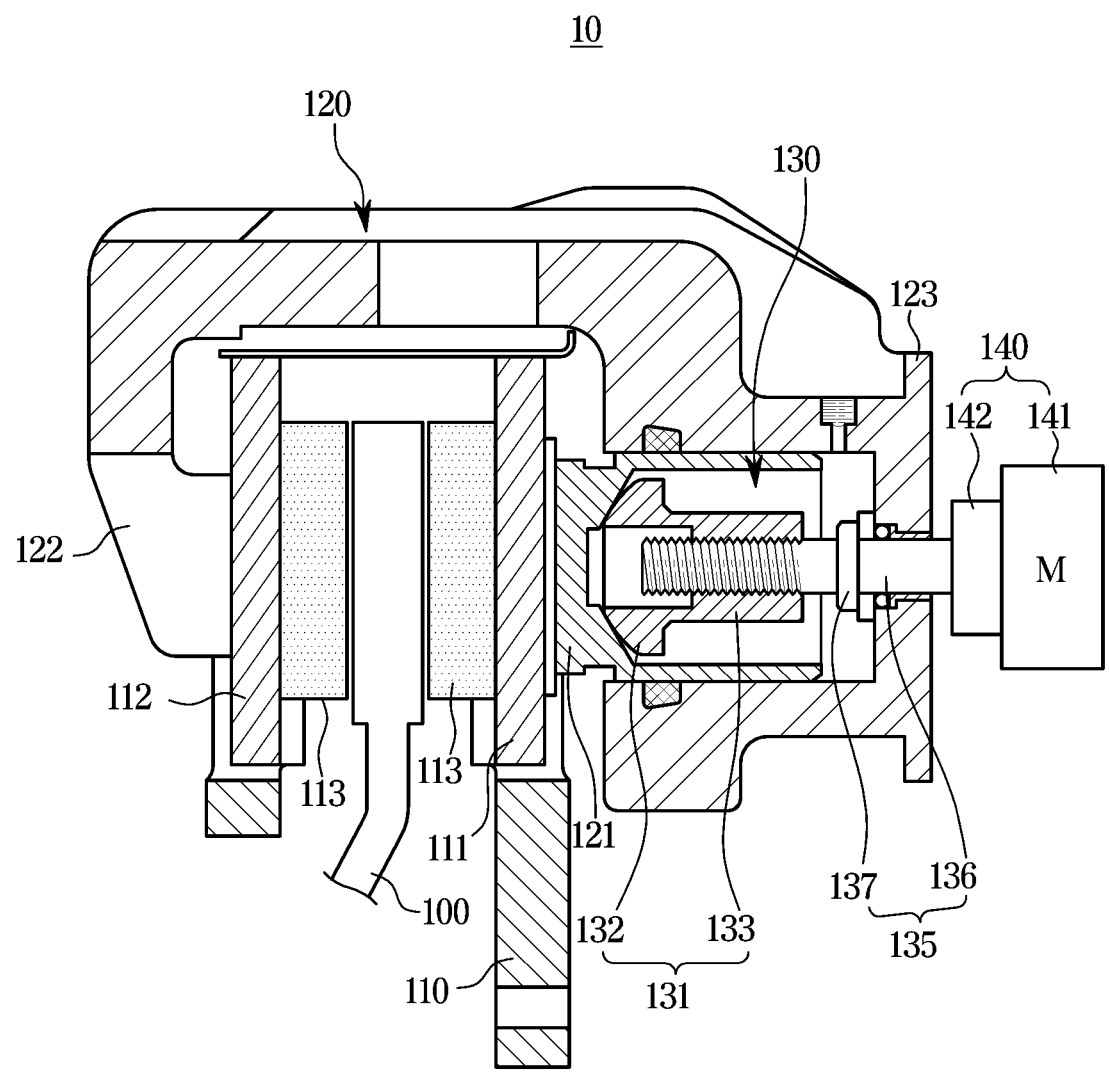
FIG. 2 illustrates an electronic parking brake applied in an electronic parking brake system according to an embodiment.

FIG. 2 illustrates an EPB applied in an electronic parking brake system according to an embodiment.

Referring to FIG. 2, the EPB 10 may include a carrier 110 on which a pair of pad plates 111 and 112 are installed movably in forward and backward directions to press a brake disc 100 that rotates with a wheel of a vehicle, a caliper housing 120 slidably installed on the carrier 110 and including a cylinder 123 in which a piston 121 is movably installed in forward and backward directions by braking hydraulic pressure, a power conversion unit 130 provided to press the piston 121, and a motor actuator 140 provided to deliver a rotational force to the power conversion unit 130 using the motor M.

The pair of pad plates 111 and 112 are divided into an inner pad plate 111 disposed to be in contact with the piston 121 and an outer pad plate 112 disposed to be in contact with a finger part 122 of the caliper housing 120. The pair of pad plates 111 and 112 are installed on the carrier 110 fixed to a vehicle body so that the pair of pad plates 111 and 112 may move toward both sides of the brake disc 100. Also, brake pads 113 are attached to one surface of each of the pair of pad plates 111 and 112 that face the brake disc 100.

The caliper housing 120 is slidably installed on the carrier 110. More specifically, the power conversion unit 130 is installed at a rear of the caliper housing 120, and the caliper housing 120 includes the cylinder 123 in which the piston 121 is movably installed in forward and backward directions and the finger part 122 bent in a lower direction to operate the outer pad plate 112. The finger part 122 and the cylinder 123 are integrally formed.

The piston 121 is provided in a cylindrical shape to have a u-shaped inside like a cup, and slidably inserted inside the cylinder 123. The piston 121 presses the inner pad plate 111 toward the brake disc 100 by an axial force of the power conversion unit 130 that receives the rotational force of the motor actuator 140. Accordingly, when the axial force of the power conversion unit 130 is applied, the piston 121 moves toward the inner pad plate 111, thereby pressing the inner pad plate 111. The caliper housing 120 operates in an opposite direction to the piston 121 by a reaction force, and thus the finger part 122 presses the outer pad plate 112 to the brake disc 100 side. Accordingly, braking may be performed.

The power conversion unit 130 may receive the rotational force form the motor actuator 140 and function to press the piston 121 to the inner pad plate 111 side.

The power conversion unit 130 may include a nut member 131, disposed inside the piston 121 to be in contact with the piston 121, and a spindle member 135 screwed to the nut member 131.

The nut member 131 is disposed inside the piston 121 in a state where rotation thereof is limited, and is screwed to the spindle member 135.

The nut member 131 may include a head portion 132 provided to be in contact with the piston 121, and an engagement portion 133 extending from the head portion 132 and in which a female screw thread is formed on an inner circumferential surface thereof in order to be screwed to the spindle member 135.

The nut member 131 moves forward or backward depending on a rotation direction of the spindle member 135, and may function to press the piston 121 or release the pressure on the piston 121. In this instance, the forward direction may be a movement direction in which the nut member 131 approaches the piston 121. The backward direction may be a movement direction in which the nut member 131 is away from the piston 121. In addition, the forward direction may be a movement direction in which the piston 121 approaches the brake pad 113. The backward direction may be a movement direction in which the piston 121 is away from the brake pad 113.

The spindle member 135 may include a shaft portion 136, which passes through a rear portion of the caliper housing 120 and rotates by receiving the rotational force of the motor actuator 140, and a flange portion 137 radially extending from the shaft portion 136. The shaft portion 136 may have one side which is rotatably installed and passes through a rear side of the cylinder 123, and the other side disposed inside the piston 121. In this instance, the one side of the shaft portion 136 that passes through the rear portion of the cylinder 123 is connected to an output shaft of a reducer 142 to receive the rotational force of the motor actuator 140.

The motor actuator 140 may include an electric motor 141 and the reducer 142.

The electric motor 141 moves the nut member 131 forward or backward by rotating the spindle member 135, thereby pressing the piston 121 or releasing the pressure on the piston 121.

The reducer 142 may be provided between the output side of the electric motor 141 and the spindle member 135.

Through the above configuration, when parking is performed, the EPB 10 may rotate the spindle member 135 in one direction using the motor actuator 140, thereby moving the nut member 131 and pressing the nut member 131. The piston 121 pressed by the movement of the nut member 131 presses the inner pad plate 111, and thus the brake pad 113 comes into close contact with the brake disc 100, thereby may perform an engagement operation that generates a clamping force.

Also, when parking is released, the EPB 10 may rotate the spindle member 135 in an opposite direction using the motor actuator 140, thereby moving the nut member 131 pressed by the piston 121 backward. The pressure on the piston 121 may be released by the backward movement of the nut member 131. Due to the release of the pressure on the piston 121, the brake pad 113 may be spaced apart from the brake disc 100, thereby may perform a disengagement operation that releases the clamping force.

Referring again to FIG. 1, the EPB switch 20 is for receiving a driver's intention with respect to the EPB 10, and may be provided around a driver's seat of the vehicle.

The EPB switch 20 is turned on or off by a driver.

When the EPB switch 20 is on, a signal corresponding to a parking operation command (engagement command) is transmitted to the controller 30. When the EPB switch 20 is off, a signal corresponding to a parking release command (disengagement command) is transmitted to the controller 30.

The controller 30 may engage or disengage the EPB 10 according to an operation signal of the EPB switch 20 or an operation signal generated by a program related to an electronic parking brake operation.

The controller 30 receives power from the battery 40.

The controller 30 drives the motor M by supplying the power provided from the battery 40 to the motor M of the EPB 10, thereby generating the clamping force. The controller 30 may supply or block the power to the motor M when generating or releasing the clamping force by driving the motor M of each EPB 10.

The controller 30 is connected to a controller area network (CAN) bus 50 which is a communication bus used for CAN communication. The controller 30 may perform communication with controllers of various systems through the CAN bus 50.

The controller 30 may perform communication with a black box controller 61 that performs overall control of a black box 60 through the CAN bus 50.

Figure 3:
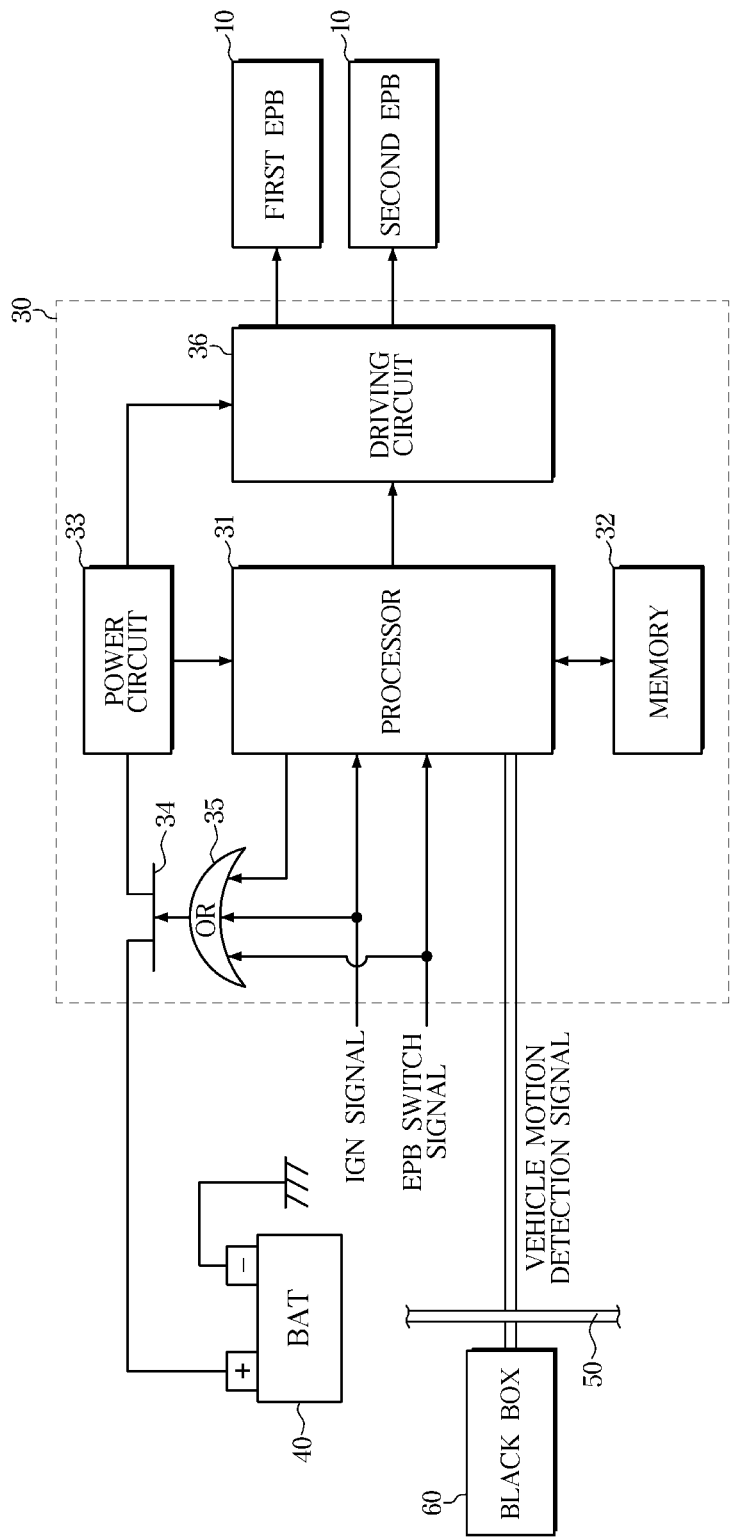
FIG. 3 illustrates a control block of a controller of an electronic parking brake system according to an embodiment.

FIG. 3 illustrates a control block of a controller of an electronic parking brake system according to an embodiment.

Referring to FIG. 3, the controller 30 may include a processor 31, a memory 32, a power circuit 33, a power switch 34, an OR circuit 35 and a driving circuit 36.

The processor 31 may control overall operations of the electronic parking brake system.

The memory 32 may store a program for processing or control of the processor 31 and various data for operating the electronic parking brake system.

The memory 32 may include a volatile memory such as a static random access memory (S-RAM) and dynamic random access memory (D-RAM), and a non-volatile memory such as a flash memory, a read only memory (ROM), an erasable programmable read only memory (EPROM), and the like.

The power circuit 33 generates a predetermined operating voltage from power provided from the battery 40. The power circuit 33 may generate a driving voltage of the processor 31 or the driving circuit 36. The processor 31 or the driving circuit 36 may be operated according to the driving voltage provided by the power circuit 33.

The power switch 34 is provided between the battery 40 and the power circuit 33, and is for supplying battery power to the power circuit 33 from the battery 40 or blocking the battery power. The power switch 34 may include a metal oxide semiconductor field effect transistor (MOSFET). The power switch 34 may be turned on or off by an output of the OR circuit 35 to control power supply from the battery 40 to the power circuit 33.

When an ignition switch indicating a starting state of a vehicle is turned on or the EPB switch 20 indicating an intention to engage or disengage the EPB 10 is turned on, the OR circuit 35 may supply power of the battery 40 to the power circuit 33 by turning on the power switch 34. Also, the OR circuit 35 may turn on or off the power switch 34 according to a control signal of the processor 31. As such, the power switch 34 is turned on by the OR circuit 35, and thus the operating voltage may be generated in the power circuit 33.

The driving circuit 36 supplies a current to the motors M 141 of first and second EPBs 10 according to the control signal of the processor 31 and controls a direction of the current to rotate the motor M 141 forward or reverse. The rotation of the motor M 141 forward or reverse allows the brake pad 113 to move toward or move away from the brake disc 100, thereby generating or releasing a clamping force. Accordingly, the EPB 10 may be engaged or disengaged.

The processor 31 receives an ignition signal (IGN signal) and an EPB switch signal. The processor 31 may determine a starting state of the vehicle from the IGN signal. The processor 31 may determine an intention to engage or disengage the EPB 10 from the EPB switch signal.

As described above, the EPB 10 may be engaged only while the driving voltage is supplied to the processor 31. Accordingly, in a state where the driving voltage is cut off in the processor 31 since an ignition of the vehicle is turned off, when the vehicle with the EPB 10 engaged is moved due to an external impact, etc., the EPB 10 may not be additionally engaged, causing an accident.

According to embodiments, when the vehicle with the EPB 10 engaged is moved in a state where the ignition is turned off, the EPB 10 may be automatically re-engaged to prevent an accident.

To re-engage the EPB 10 automatically in the above-described state, the processor 31 is required to wake up from a sleep mode.

The processor 31 may receive a black box signal from the black box 60 through CAN communication. The processor 31 receives a vehicle motion detection signal which is the black box signal output to the black box 60 through the CAN bus 50. The vehicle motion detection signal may be a signal for detecting a movement of vehicle when a parked vehicle is moved by an impact by another vehicle, and the like. For example, the vehicle motion detection signal may be a signal value of a G-sensor provided in the black box. The G-sensor outputs data quantifying how much the black box 60 moved forward, backward, left, right, up and down due to an external impact.

The processor 31 is configured to wake up by the vehicle motion detection signal received through the CAN bus 50. That is, in the state where the EPB 10 is engaged and the ignition is off, the processor 31 may wake up by a voltage of the vehicle motion detection signal received through the CAN bus 50.

Figure 4:
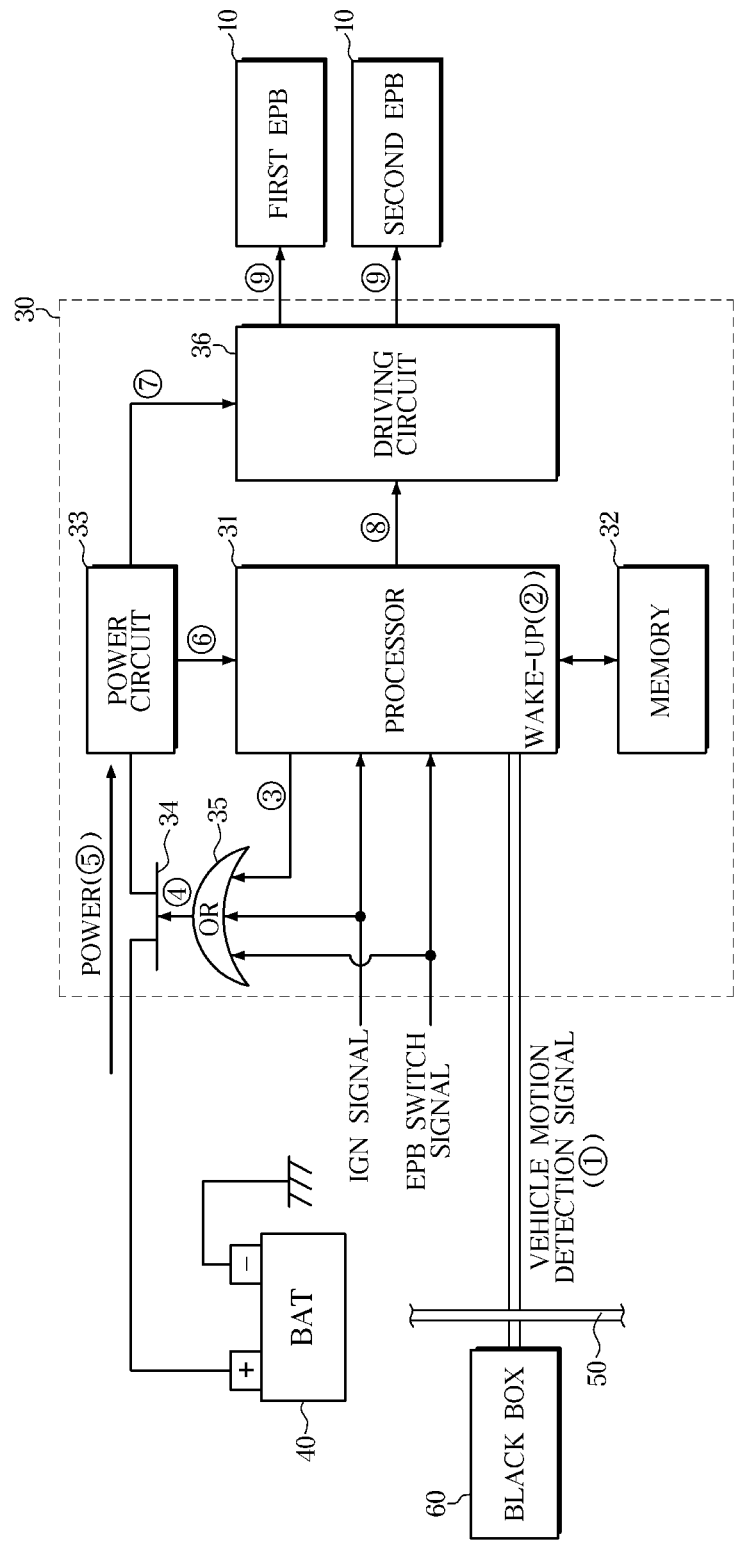
FIG. 4 illustrates waking up a processor according to a vehicle motion detection signal from a black box and engaging an electronic parking brake (EPB) in an electronic parking brake system according to an embodiment.

FIG. 4 illustrates waking up a processor according to a vehicle motion detection signal from a black box and engaging an EPB in an electronic parking brake system according to an embodiment.

Referring to FIG. 4, in a state where the EPB 10 is engaged and an ignition is off, the processor 31 receives a vehicle motion detection signal received from the black box 60 through the CAN bus 50 (①).

The processor 31 wakes up by the received vehicle motion detection signal. The processor 31 is switched from a sleep mode to a wake-up mode (②). In the sleep mode, a minimum current is consumed to prevent battery discharge after the ignition is turned off, and a driving voltage may not be supplied to the processor 31. The wake-up mode may be a normal driving mode.

When the processor 31 wakes up, the processor 31 outputs a control signal to the OR circuit 35 to turn on the power switch 34 (③).

The OR circuit 35 turns on the power switch 34 by the control signal output by the processor 31 (④).

As the power switch 34 is turned on, battery power is supplied to the power circuit 33 from the battery 40 (⑤).

The power circuit 33 generates a driving voltage of the processor 31 and the driving circuit 36 from the supplied battery power, and supplies the driving voltage to the processor 31 and the driving circuit 36 (⑥ and ⑦).

The processor 31 outputs a control signal to the driving circuit 36 to drive the motors M 141 of the first and second EPBs 10 (⑧).

The driving circuit 36 engages the first and second EPBs 10 by driving the motors M 141 of the first and second EPBs 10 according to the control signal output from the processor 31 (⑨).

Figure 5:
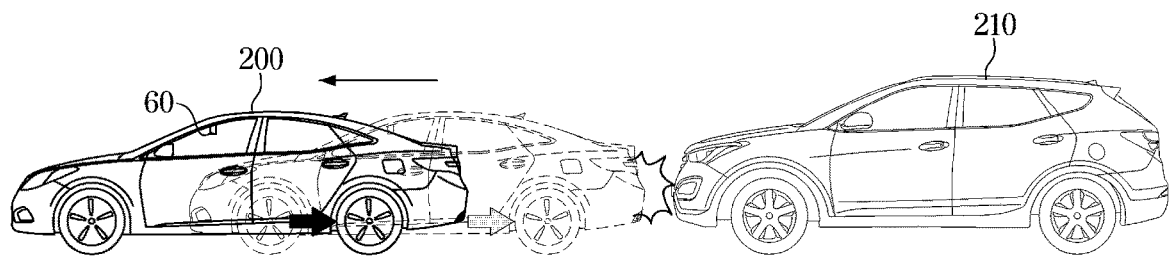
FIG. 5 illustrates an example of re-engaging an EPB when a parked vehicle with the EPB engaged is moved, in an electronic parking brake system according to an embodiment.

FIG. 5 illustrates an example of re-engaging an EPB when a parked vehicle with the EPB engaged is moved, in an electronic parking brake system according to an embodiment.

Referring to FIG. 5, when a parked vehicle 200 with the EPB 10 engaged and the ignition turned off collides with another vehicle 210, the parked vehicle 200 is bounced forward.

When an external impact is applied to the parked vehicle 200, the black box 60 provides the processor 31 with a vehicle motion detection signal, detected through a G-sensor in the black box 60, through the CAN bus 50.

The processor 31 wakes up by the received vehicle motion detection signal.

The processor 31 determines whether a slight impact or a large impact is applied to the parked vehicle 200 based on the received vehicle motion detection signal. When the large impact is applied to the parked vehicle 200, that is, according to a degree of movement of the parked vehicle 200, the processor 31 automatically re-engages the EPB 10, thereby may prevent an accident. In this instance, when the large impact is applied to the parked vehicle 200, the processor 31 turns on the power switch 34 to receive a driving voltage from the power circuit 33 and provide the driving voltage to the driving circuit 36. In addition, when waking up by the received vehicle motion detection signal, the processor 31 may turns on the power switch 34 to receive the driving voltage from the power circuit 33.

Figure 6:
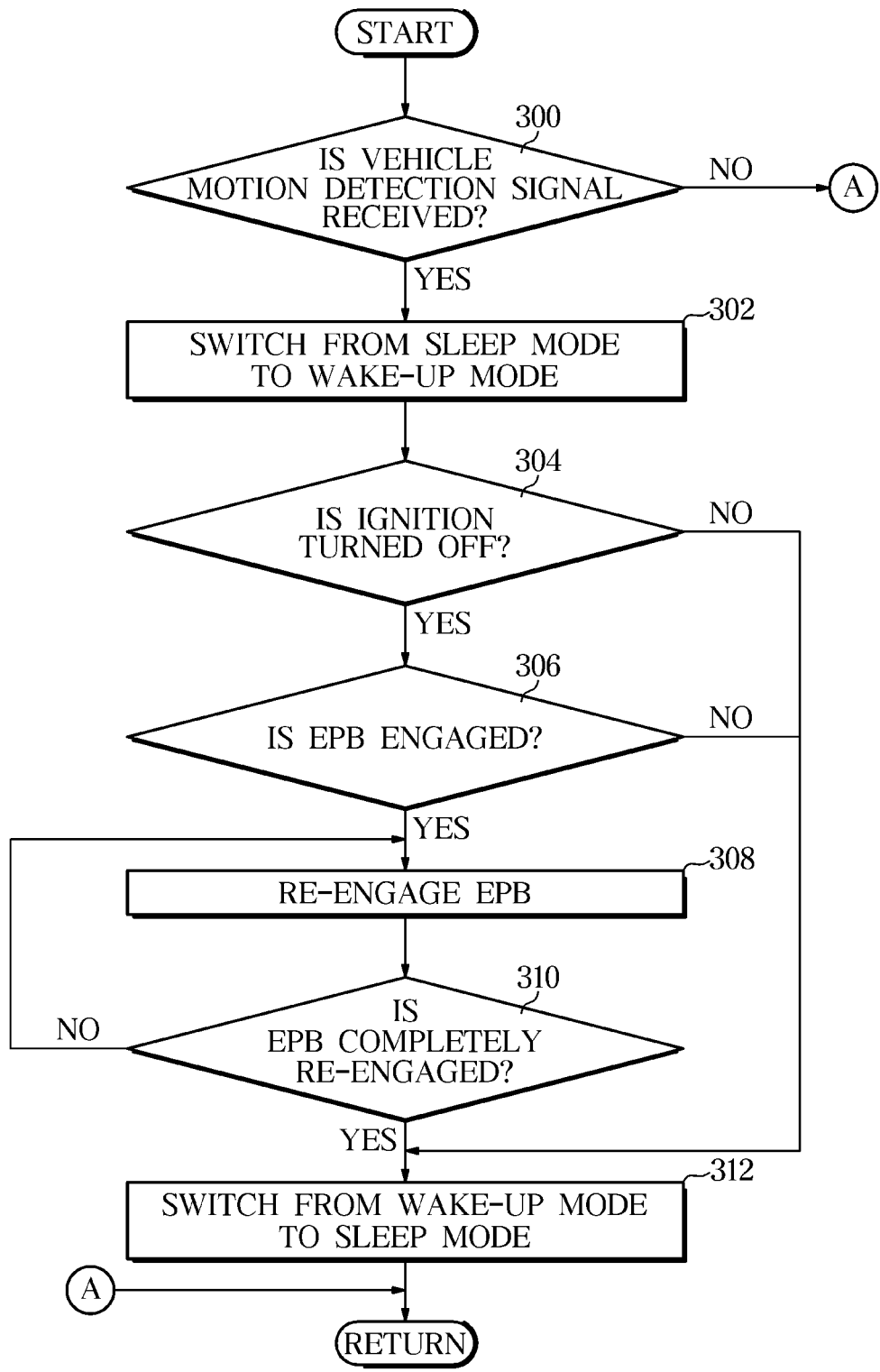
FIG. 6 is a flowchart illustrating a control method of an electronic parking brake system according to an embodiment.

FIG. 6 is a flowchart illustrating a control method of an electronic parking brake system according to an embodiment.

Referring to FIG. 6, a control method of an electronic parking brake system according to an embodiment may include determining whether a vehicle motion detection signal is received from the black box 60 (300), switching from a sleep mode to a wake-up mode (302), determining whether an ignition is turned off (304), determining whether the EPB 10 is engaged (306), re-engaging the EPB 10 (308), determining whether the EPB 10 is completely re-engaged (310) and switching from the wake-up mode to the sleep mode (312).

When the vehicle motion detection signal is received from the black box 60, the processor 31 is switched from the sleep mode to the wake-up mode by the received vehicle motion detection signal. In this instance, the processor 31 may turn on the power switch 34 to receive operating power from the power circuit 33 and maintain a wake-up state.

After being switched from the sleep mode to the wake-up mode, the processor 31 determines whether the ignition is turned off and the EPB 10 is engaged. In this instance, the processor 31 may determine whether the ignition is turned off and the EPB 10 is engaged, only when a degree of movement of a vehicle is greater than a reference degree of movement from the vehicle motion detection signal. When the degree of movement of the vehicle is less than the reference degree of movement, the wake-up mode may be switched to the sleep mode.

When it is determined that the ignition is turned off and the EPB 10 is engaged, the processor 31 re-engages the EPB 10 through the driving circuit 36.

The processor 31 determines whether the EPB 10 is completely re-engaged. The processor 31 may determine whether the EPB 10 is completely re-engaged, using a location sensor of the electric motor 141 in the EPB 10.

When it is determined that the EPB 10 is completely re-engaged, the processor 31 may switch from the wake-up mode to the sleep mode again, immediately or after a preset period of time.

As described above, according to the disclosure, when a parked vehicle with the EPB 10 engaged is moved while an ignition is off, an accident may be prevented by waking up by a vehicle motion detection signal received from the black box 60 and automatically re-engaging the EPB 10.

As is apparent from the above, according to the embodiments of the disclosure, the electronic parking brake system and the control method thereof can automatically re-engage an EPB, when a parked vehicle with the EPB engaged is moved while an ignition is off, thereby preventing an accident.

Meanwhile, the aforementioned controller and/or its constituent components may include at least one processor/microprocessor(s) combined with a computer-readable recording medium storing a computer-readable code/algorithm/software. The processor/microprocessor(s) may execute the computer-readable code/algorithm/software stored in the computer-readable recording medium to perform the above-descried functions, operations, steps, and the like.

The aforementioned controller and/or its constituent components may further include a memory implemented as a non-transitory computer-readable recording medium or transitory computer-readable recording medium. The memory may be controlled by the aforementioned controller and/or its constituent components and configured to store data, transmitted to or received from the aforementioned controller and/or its constituent components, or data processed or to be processed by the aforementioned controller and/or its constituent components.

The disclosed embodiment may be implemented as the computer-readable code/algorithm/software in the computer-readable recording medium. The computer-readable recording medium may be a non-transitory computer-readable recording medium such as a data storage device capable of storing data readable by the processor/microprocessor(s). For example, the computer-readable recording medium may be a hard disk drive (HDD), a solid state drive (SDD), a silicon disk drive (SDD), a read only memory (ROM), a compact disc read only memory (CD-ROM), a magnetic tape, a floppy disk, an optical recording medium, and the like.

What is claimed is:

1. An electronic parking brake system, comprising:
an electronic parking brake comprising a pair of brake pads disposed on both sides of a brake disc rotating with a rear wheel of a vehicle, a piston provided to press the pair of brake pads, a nut member provided to press the piston, a spindle member provided to move the nut member, and an electric motor configured to rotate the spindle member; and
a controller configured to control the electric motor to engage the electronic parking brake,
wherein, when a vehicle motion detection signal is received from a black box through a controller area network (CAN) bus in a state where an ignition is turned off and the electronic parking brake is engaged, the controller is configured to re-engage the electronic parking brake.

2. The electronic parking brake system of claim 1, wherein the controller is configured to switch from a sleep mode to a wake-up mode according to the received vehicle motion detection signal.

3. The electronic parking brake system of claim 2, wherein the controller is configured to determine a degree of movement of the vehicle from the received vehicle motion detection signal, and switch from the sleep mode to the wake-up mode according to the determined degree of movement.

4. The electronic parking brake system of claim 1, wherein the controller comprises a processor, a power circuit, a power switch, an OR circuit, and a driving circuit,
the power circuit is configured to generate an operating power from a power provided from a battery and provide the operating power to the processor and the driving circuit,
the power switch is provided between the battery and the power circuit and configured to supply battery power from the battery to the power circuit or block the battery power,
the OR circuit is configured to turn on or off the power switch according to a control signal of the processor,
the driving circuit is configured to drive the electric motor according to the control signal of the processor, and
when the vehicle motion detection signal is received from the black box through the CAN bus in the state where the ignition is turned off and the electronic parking brake is engaged, the processor is configured to turn on the power switch through the OR circuit to receive the operating power from the power circuit.

5. A control method of an electronic parking brake system configured to control an electronic parking brake comprising a pair of brake pads disposed on both sides of a brake disc rotating with a rear wheel of a vehicle, a piston provided to press the pair of brake pads, a nut member provided to press the piston, a spindle member provided to move the nut member, and an electric motor configured to rotate the spindle member, the control method comprising:
when a vehicle motion detection signal is received from a black box through a CAN bus in a state where an ignition is turned off and the electronic parking brake is engaged, re-engaging the electronic parking brake.

6. The control method of claim 5, wherein the re-engaging of the electronic parking brake comprises switching from a sleep mode to a wake-up mode according to the received vehicle motion detection signal.

7. The control method of claim 6, wherein the re-engaging of the electronic parking brake comprises determining a degree of movement of the vehicle from the received vehicle motion detection signal, and switching from the sleep mode to the wake-up mode according to the determined degree of movement.

* * * * *